UNITED STATES PATENT OFFICE.

CHARLES B. MORGAN, OF OAKLAND, CALIFORNIA.

PROCESS OF REDUCING IRON ORES.

947,448.  Specification of Letters Patent.  Patented Jan. 25, 1910.

No Drawing.   Application filed May 10, 1909.  Serial No. 495,196.

*To all whom it may concern:*

Be it known that I, CHARLES B. MORGAN, a citizen of the United States, residing at Oakland, in the county of Alameda and State of California, have invented certain new and useful Improvements in Processes of Reducing Iron Ores, of which the following is a specification.

This invention relates to the process of reducing iron ores into metallic iron and freeing the metallic iron from its attendant gangue or slag by means of a liquefiable carbon onto which the melted ore charge is delivered, the process hereinafter described being more specifically an improvement in the process of reducing iron ores set forth and described in United States Letters Patent #910,707, granted unto me on the 26th day of January, 1909.

The process of the present invention consists in charging into a furnace a mixture of iron ore having intermixed therewith a suitable flux and melting the material thus charged into the furnace to a fluid condition. The charge thus melted is withdrawn from the furnace and deposited while in its fluid condition into a second furnace containing a bed of asphaltum or other carbonaceous matter susceptible of being liquefied under the influence of the deposited molten charge. As the molten charge is deposited onto the bed of asphaltum or other carbonaceous matter, the same is at once liquefied and the contained carbon brought into intimate contact with the oxygen of the ore, producing a quick reaction, which releases the metallic iron from its attendant gangue or slag. The released metallic iron precipitates, and is thereafter treated in the usual manner.

By first melting the ore charge before reduction has taken place, and then pouring the liquid charge upon the asphaltum or bed of carbonaceous matter and thus bringing the ore and carbon into intimate contact, a quick reaction takes place, which results in the carbon immediately combining with the oxygen in the ore and quickly releasing the metallic iron, and thereby causing the separation of the iron from its attendant gangue or slag.

Having thus described the invention what is claimed as new and desired to be protected by Letters Patent is:—

1. The process of reducing iron ore into metallic iron, which consists in first melting the ore charge to a liquid state, and thence discharging the liquid charge onto a bed of liquefiable carbonaceous substance which is liquefied thereby and intermingles with the melted ore charge and separates the metallic iron.

2. The process of reducing iron ore into metallic iron, the same consisting in reducing the ore charged with its flux into a liquid condition, then withdrawing the liquefied ore charge and discharging the same onto a bed of asphaltum or liquefiable carbonaceous substance which intermingles with the melted charge and separates the metallic iron from its attendant gangue or slag.

In testimony whereof I have signed my name to this specification in the presence of two subscribing witnesses.

CHARLES B. MORGAN.

Witnesses:
N. A. ACKER,
D. B. RICHARDS.